Oct. 27, 1936.  S. FISHMAN  2,058,969
SPECTACLES
Filed Aug. 15, 1935   2 Sheets-Sheet 1
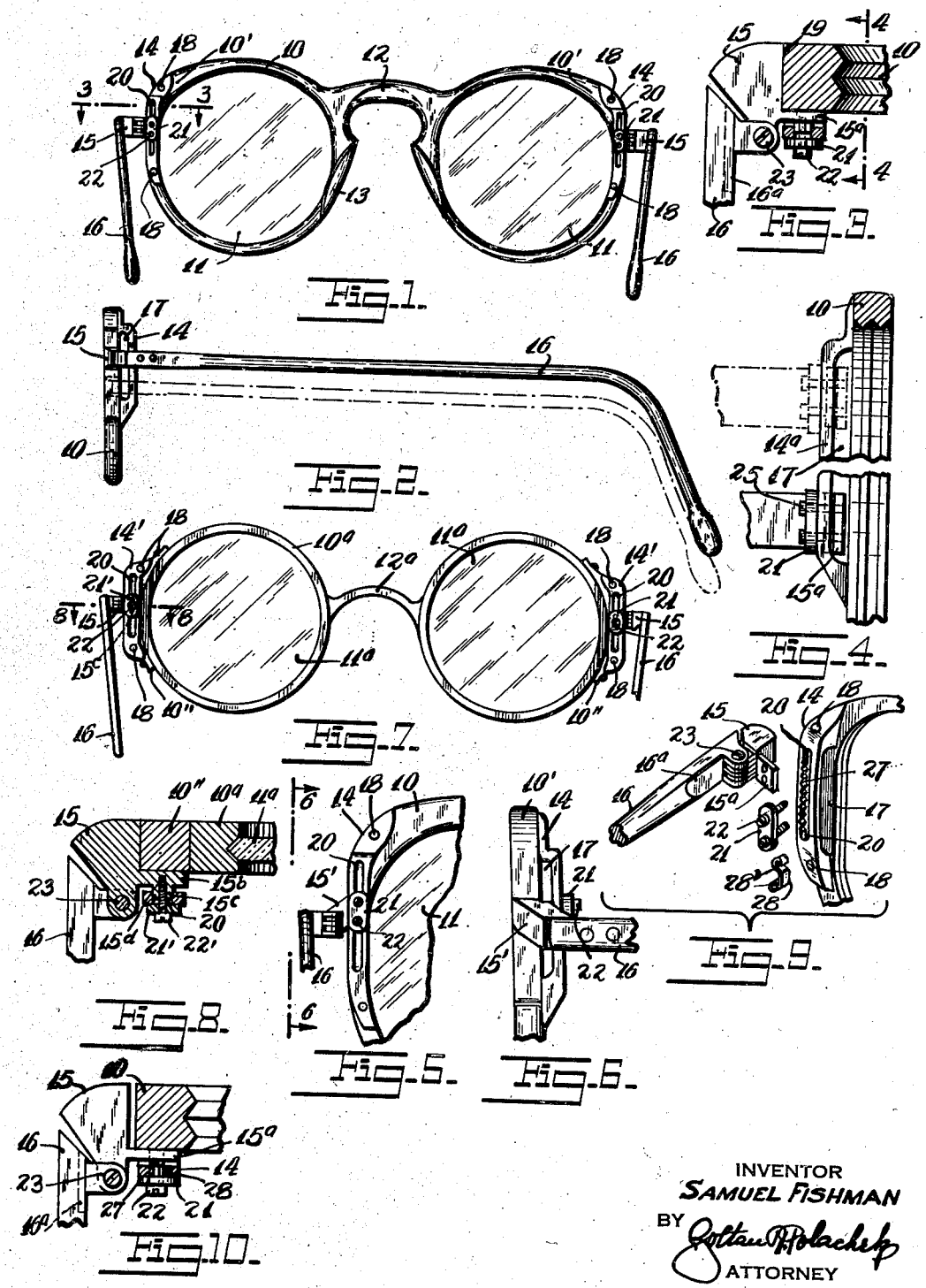
INVENTOR
SAMUEL FISHMAN
BY
ATTORNEY

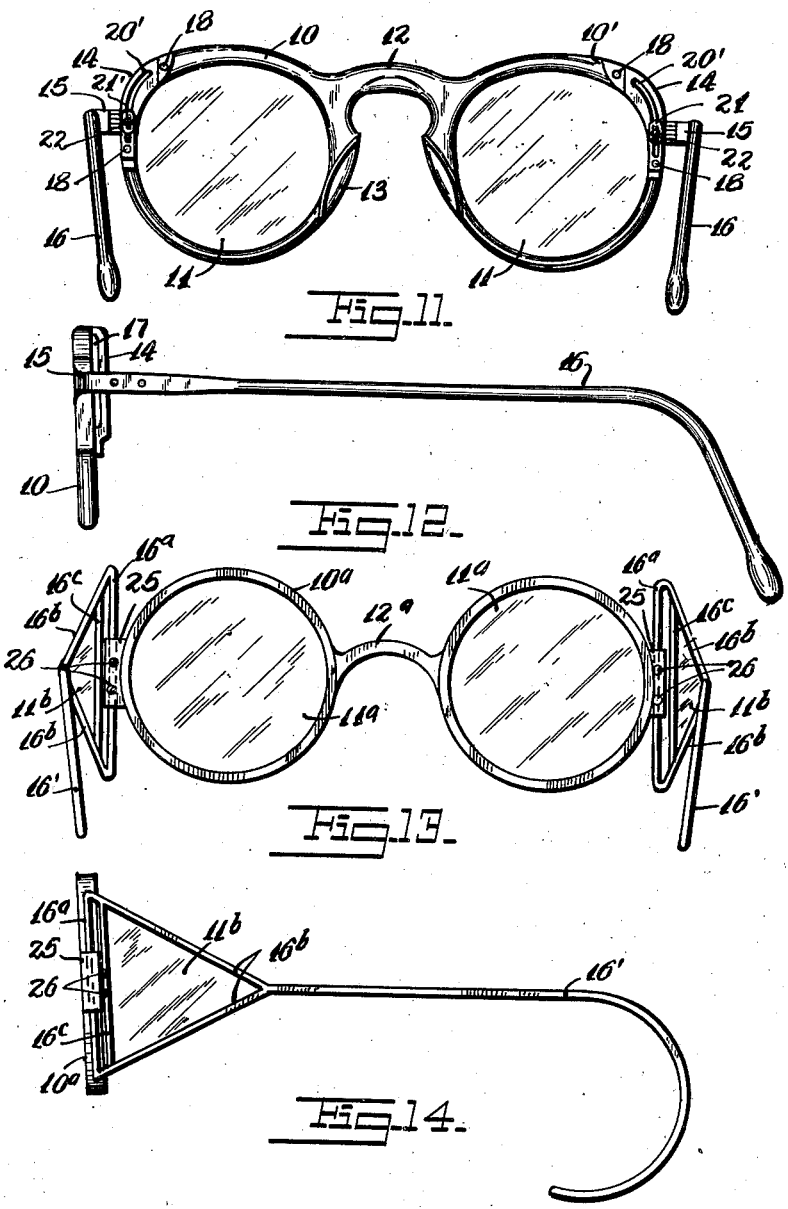

Patented Oct. 27, 1936

2,058,969

UNITED STATES PATENT OFFICE 2,058,969

SPECTACLES

Samuel Fishman, Bronx, N. Y., assignor to Atlas Zylonite Corp., Brooklyn, N. Y.

Application August 15, 1935, Serial No. 36,243

5 Claims. (Cl. 88—53)

This invention relates to new and useful improvements in spectacles.

The invention has for an object the construction of a pair of spectacles which is characterized by track elements mounted upon the ends of the frame for the lenses, and temple bars associated with slide elements and holding means, cooperating with the track elements to permit vertical adjustments of the temple bars to control the view when the spectacles are worn.

More particularly, the invention contemplates the provision of track elements which are characterized by small end portions attached upon the frame and intermediate portions spaced from the frame, and said intermediate portions being formed with slots whereby the slide members may be engaged in the space beneath the intermediate portions and associated with the slots to control the sliding connection.

Still further the invention proposes the use of small screws extending through said slots and cooperating with the underneath pieces by which the slides may be held in various fixed positions.

Still further the invention contemplates a modified arrangement whereby the temple bars terminate in vertical sections which slidably engage brackets mounted on the ends of the frame for the lenses, and means for holding the vertical sections in various adjusted positions.

A further object of the invention is an arrangement whereby resilient elements normally urge the slide members into positions into which they are latched vertically, and an arrangement whereby the slide elements may be manually moved to positions which release them and permit adjustments.

Another object is the construction of an article as described which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is an elevational view of the rear side of a pair of spectacles constructed according to this invention.

Fig. 2 is an end elevational view of Fig. 1 looking from the left hand end.

Fig. 3 is a fragmentary enlarged sectional view taken on the line 3—3 of Fig. 1.

Fig. 4 is a fragmentary enlarged sectional view taken on the line 4—4 of Fig. 3.

Fig. 5 is a fragmentary enlarged view similar to a portion of Fig. 1 but illustrating another embodiment of the invention.

Fig. 6 is a fragmentary elevational view looking in the direction of arrows on the line 6—6 of Fig. 5.

Fig. 7 is an elevational view of the rear sides of a pair of spectacles constructed according to a modification of the invention.

Fig. 8 is a fragmentary horizontal sectional view taken on the line 8—8 of Fig. 7.

Fig. 9 is a fragmentary perspective view of a pair of spectacles constructed according to another embodiment of the invention, the parts thereof being shown separated so that certain of their details are readily understandable.

Fig. 10 is a horizontal sectional view of Fig. 9 in assembled position.

Fig. 11 is a similar view to Fig. 1, but showing a modified form of the invention.

Fig. 12 is an end elevational view of Fig. 11 looking from the left hand end.

Fig. 13 is an elevational view of the rear sides of a pair of spectacles constructed according to a modification of the invention.

Fig. 14 is a fragmentary end elevational view of Fig. 13 looking from the left hand end.

The spectacles, according to this invention, comprise a frame 10 for the lenses 11. The frame 10 is formed with a conventional nose bridge 12 and nose supports 13. The outer end portions 10' of the frame, support track elements 14. Slides 15 cooperate with the track elements 14. A means is provided for holding the slides in various adjusted positions on the track elements, hereinafter fully described. Temple bars 16 are pivotally connected with the slide members 15.

The track elements 14 have central portions 14ᵃ spaced from the end portions 10' of the frame to produce a passage 17 between these portions and the side of the frame. The track elements 14 are attached on the frame by rivets 18 which engage through their ends and the frame. The slides 15 have lug portions 15ᵃ which extend into the spaces 17. The slide portions are adapted to engage against the sides of the end portions 10' of the frame, the contacting areas being indicated by reference numeral 19 in Fig. 3, to assist in the sliding of the slide members.

The central portions 14ᵃ of the track elements 14 are formed with vertical slots 20. Washer elements 21 are disposed upon the outer faces of the track elements 15 and have openings into which screws 22 engage. These screws pass through the slots 20 and threadedly into lug portions 15ᵃ. The screws 22 are adapted to be screwed downward so as to firmly clamp the washer elements 21 against the brackets 14 to hold the slides 15 in various vertically adjusted positions. The slides 15 have several projecting lug portions from brackets 16ᵃ mounted on the inner ends of the temple bars, through which pivotal screws 23 engage. These pivotal screws serve to pivotally support the temple bars. In Figs. 2 and 4 the dot and dash lines indicate adjusted positions of the temple bars.

In Figs. 5 and 6 another embodiment of the invention has been disclosed which is very similar to the previous form, distinguishing therefrom merely in the construction of the slide members 15'. In this form of the invention the slide members 15' are arranged at an inclination so that the temple bars are located slightly lower than the location in the prior arrangement. This may be distinctly seen by first inspecting Fig. 1 and noting that the slide members 15 are in the horizontal. An inspection of Fig. 5 will show the slide member 15' inclined downwards.

In Figs. 7 and 8 the track elements 14' have been mounted on external extension pieces 10'' of frame 10ᵃ, which support lenses 11ᵃ and contain nose piece 12ᵃ. In this construction the lug portions 15ᵇ are provided with rectangular bosses 15ᶜ which project partially into slots 20. At the opposite sides of track elements 14' washer elements 21' are firmly clamped by screw 22' which engage the threaded portions 15ᵈ of bosses 15ᶜ. In other respects this construction is similar to the construction in the previous figures.

In Figs. 9 and 10 a still further modified form of the invention is disclosed which is very similar to that disclosed in Figs. 1–5 inclusive, but distinguishing in the provision of a modification for holding the slide elements in various adjusted positions on the track elements. According to this form of the invention the material of the track elements 14 to one side of the slots 20 is formed with serrations or teeth 27.

Small springs 28 are mounted on the screws 22 and act against the smooth sides of the slots 20 to urge the slides 15 into positions in which the screws 22 engage the serrations 27. Thus, the slides are latched in position. The springs 28 have coiled ends 28' which partially encircle the screws 22 to hold the springs in position. The central parts of the springs 28 pass between the screws 22 and engage the smooth side walls of the slots 20. In Fig. 10 the slide 15 is shown in a fixed position. This slide may be forced inward so as to close the space between it and the edge of the frame so as to disengage the screws 22 from the serration 27. The slide may then be moved vertically to a new position. When the slides are released, the springs 28 return them to their latched position.

In Figs. 11 and 12 a still further modified form of the invention is disclosed which is similar to that disclosed in Figs. 1–5 inclusive, but distinguishing in the shape of slots 20' which are curved in these figures.

In Figs. 13 and 14 another embodiment of the invention has been disclosed in which there is a frame 10ᵃ supporting the lenses 11ᵃ. This frame has a nose bridge 12ᵃ. Brackets 25 are mounted upon the edges of the frame 10ᵃ at the ends thereof. These brackets are formed with vertical openings through which sections 16ᵃ of temple bars 16' slidably engage. These temple bars 16' have their inner ends forked and the forked ends 16ᵇ are joined by a vertical member 16ᶜ. The temple bar portions 16ᵇ and 16ᶜ are grooved to receive the lenses 11ᵇ of substantially triangular shape, to aid the side vision of the wearer. The diverging ends of forked ends 16ᵇ are extended and are joined by another vertical portion 16ᵃ. Small screws 26 threadedly engage through the brackets 25 and are adapted to abut against the portions 16ᵃ for the purpose of holding the temple bars in adjusted positions. The feature of the forked ends of the temple bars is to provide a full and clear view between the fingers of the forks.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A spectacle support, comprising a frame for lenses and having flat ends and flat sides, track elements mounted on the ends of said frame and having central portions spaced from said sides, slide members on the ends of said frame and having lug portions engaging beneath said track elements and into the spaces in back of said central portions, means for holding said slide members in adjusted positions on said track elements comprising washer elements disposed on the outer sides of said tracks, and fastening members engaging thru said washer elements and into said lug portions, and temple bars pivotally connected with the slide elements.

2. A spectacle support, comprising a frame for lenses, track elements mounted on the ends of said frame in substantially vertical positions, slide members on said track elements, means for holding said slide members in adjusted positions on said track elements, and temple bars pivotally connected with the slide elements, said track elements being attached at their ends upon the frame and having their central portions slightly spaced from the face of the frame, the slide members having lug portions engaging beneath the spaced portions of the track elements.

3. A spectacle support, comprising a frame for lenses, track elements mounted on the ends of said frame in substantially vertical positions, slide members on said track elements, means for holding said slide members in adjusted positions on said track elements, and temple bars pivotally connected with the slide elements, said track elements being attached at their ends upon the frame and having their central portions slightly spaced from the face of the frame, the slide members having lug portions engaging beneath the spaced portions of the track elements, and screws engaging through vertical slots in the central portions of the track elements and threadedly engaging said lug portions for holding the slide members in fixed positions.

4. A spectacle support, comprising a frame for lenses, track elements mounted on the ends of said frame in substantially vertical positions, slide members on said track elements, means for holding said slide members in adjusted positions on said track element, and temple bars pivotally connected with the slide elements, said track elements being attached at their ends upon the frame and having their central portions slightly spaced from the face of the frame, the slide members having lug portions engaging beneath the spaced portions of the track elements, and screws engaging through vertical slots in the central portions of the track elements and threatedly engaging said lug portions for holding the slide members in fixed positions, and washer elements interposed beneath the heads of the screws and said track elements.

5. A spectacle support, comprising a frame for lenses, track elements mounted on the ends of said frame in substantially vertical positions, slide members on said track elements, means for holding said slide members in adjusted positions on said track elements, and temple bars pivotally connected with the slide elements, said means for holding the slide elements in adjusted positions comprising screws engaging through slots in the track elements and threadedly engaging lugs projecting from the slide members, washer elements beneath the heads of said screws and disposed against the side of the track elements, and springs mounted on said screws and acting against one of the sides of the slots for urging the screws against the other sides of the slots, the latter-mentioned sides of the slots being formed with serrations into which the screws engage to hold the slides in fixed positions and constituting said means.

SAMUEL FISHMAN.